(12) United States Patent
Satur

(10) Patent No.: US 9,049,932 B2
(45) Date of Patent: Jun. 9, 2015

(54) APPLIANCE MOVEMENT SYSTEM

(71) Applicant: David Ryan Satur, Fowlerville, MI (US)

(72) Inventor: David Ryan Satur, Fowlerville, MI (US)

(*) Notice: Subject to any disclaimer, the term of this patent is extended or adjusted under 35 U.S.C. 154(b) by 9 days.

(21) Appl. No.: 13/858,271

(22) Filed: Apr. 8, 2013

(65) Prior Publication Data

US 2014/0298619 A1    Oct. 9, 2014

(51) Int. Cl.
A47B 91/06    (2006.01)

(52) U.S. Cl.
CPC ............... *A47B 91/06* (2013.01); *Y10T 16/209* (2015.01)

(58) Field of Classification Search
USPC ........ 16/42 R, 42 T; 248/188.8, 188.9, 188.3, 248/188.2, 346.07, 346.11; D8/400, 402, D8/374, 354
See application file for complete search history.

(56) References Cited

U.S. PATENT DOCUMENTS

| | | | | |
|---|---|---|---|---|
| 3,883,923 | A * | 5/1975 | England | 16/42 R |
| 5,984,360 | A * | 11/1999 | Edwards et al. | 280/845 |
| 6,206,424 | B1 * | 3/2001 | Edwards et al. | 280/845 |
| 6,464,256 | B1 * | 10/2002 | Edwards | 280/845 |
| 8,635,742 | B2 * | 1/2014 | Smith et al. | 16/42 R |
| 2005/0034268 | A1 * | 2/2005 | Wurdack | 16/42 R |
| 2005/0263998 | A1 * | 12/2005 | Edwards | 280/845 |
| 2006/0179608 | A1 * | 8/2006 | Edwards | 16/42 R |
| 2008/0209686 | A1 * | 9/2008 | Lang | 16/42 T |
| 2010/0050389 | A1 * | 3/2010 | Robinson et al. | 16/42 R |
| 2012/0017688 | A1 * | 1/2012 | Shekalim | 73/700 |
| 2012/0023707 | A1 * | 2/2012 | Edwards | 16/42 R |
| 2012/0167346 | A1 * | 7/2012 | Bushey | 16/42 T |

* cited by examiner

Primary Examiner — Chuck Mah
(74) Attorney, Agent, or Firm — Harness, Dickey & Pierce, P.L.C.

(57) ABSTRACT

According to the present teachings, a system is provided which allows a user or mover to move large, heavy appliances across finished floor surfaces without damaging by scratching, indenting or cracking under the weight of the object. When placing the object on the mover's surface, the weight becomes distributed and absorbed across the mover instead of localized points such as the case with casters, wheels or legs.

11 Claims, 4 Drawing Sheets

Figure 1a
Figure 1b
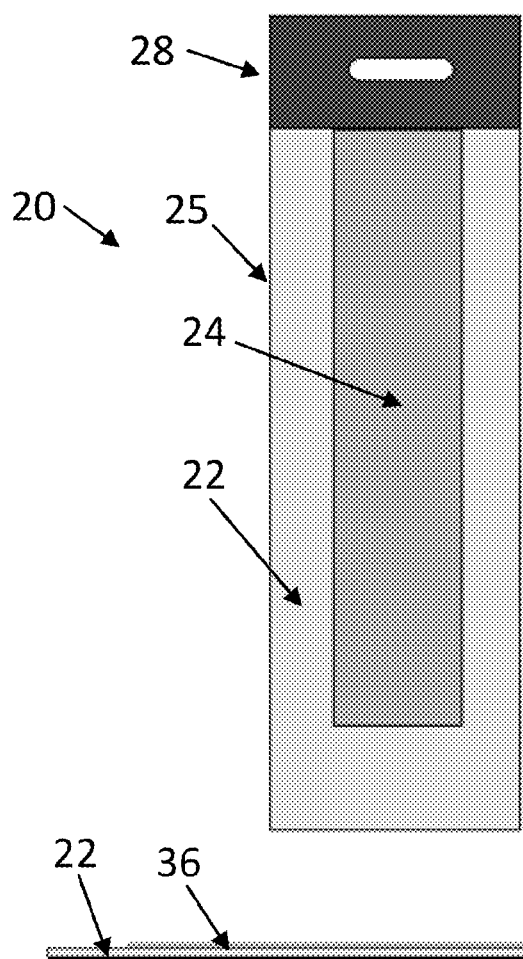
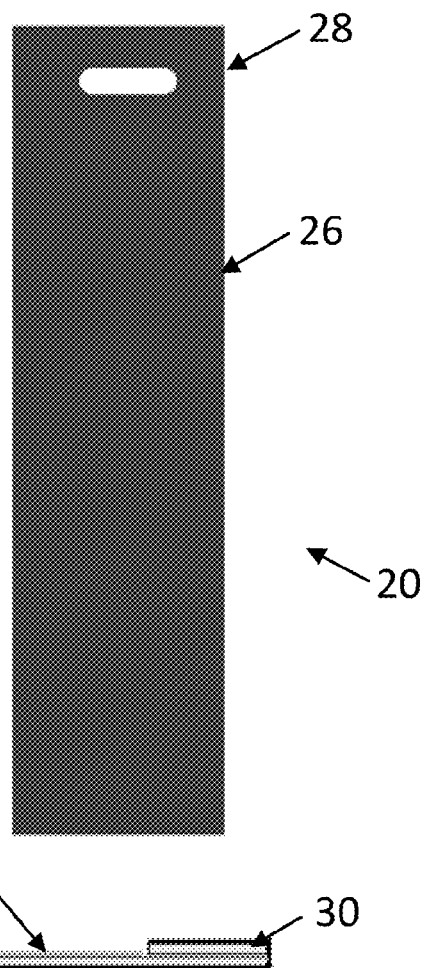
Figure 1c

APPLIANCE MOVEMENT SYSTEM

FIELD

The present disclosure relates to a system and apparatus for moving an appliance and, more particularly, to a system that allows the movement of appliances over easily damaged floor surfaces.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

After the laying of a new floor surface such as linoleum, laminate, or hardwood, often heavy appliances must be positioned onto the flooring. While often the appliances are lifted into position, more often the appliances are slid over the flooring. This movement can cause damage to the flooring surface such as gauging or scratching.

According to the present teachings, a system is provided which allows a user or mover to move large, heavy appliances across finished floor surfaces without damaging by scratching, indenting or cracking under the weight of the object. When placing the object on the mover's surface, the weight becomes distributed and absorbed across the mover instead of localized points such as the case with casters, wheels or legs.

According to other teachings, a method for moving an appliance is disclosed. The method includes placing a pair of planar laminar shims under the appliance, the shims having a reduced friction surface between the shims and the floor surface and an increased friction surface between the shims and the appliance. The friction layer holds the object in place while the object is then pushed or pulled horizontally across a surface while the underside of the mover protects the surface in addition to aiding in its movement.

Further areas of applicability of the present disclosure will become apparent from the detailed description, the claims and the drawings. The detailed description and specific examples are intended for purposes of illustration only and are not intended to limit the scope of the disclosure.

DRAWINGS

The present disclosure will become more fully understood from the detailed description and the accompanying drawings, wherein:

FIGS. 1a-1c represent top, bottom and side views for one embodiment of the appliance mover;

In the drawings, reference numbers may be reused to identify similar and/or identical elements.

DETAILED DESCRIPTION

Figure 2A:
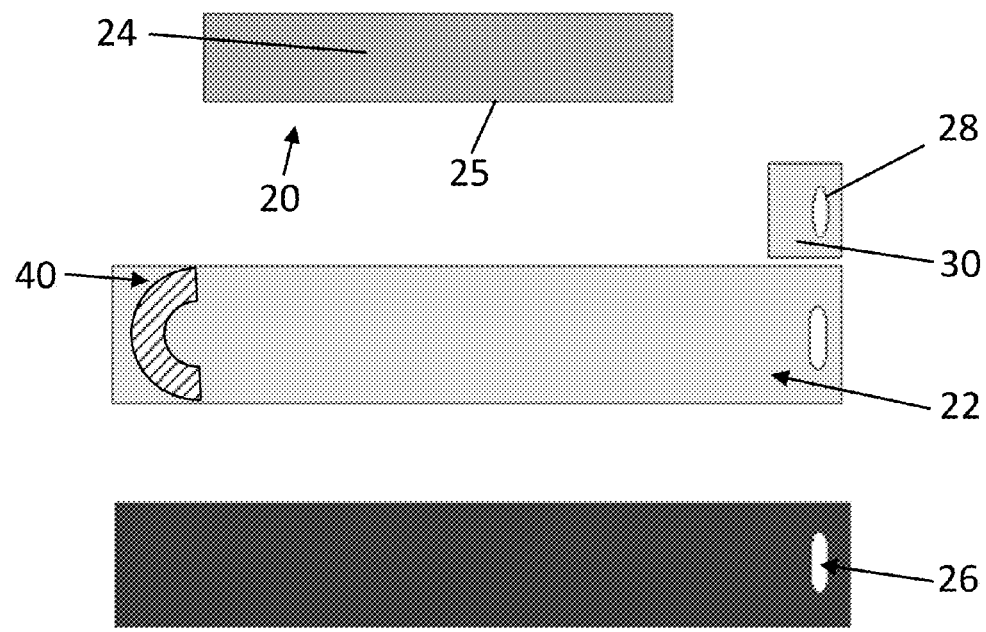
FIGS. 2a and 2b represent exploded and side sectional views of the appliance mover shown in FIGS. 1a-1c.
Figure 2B:
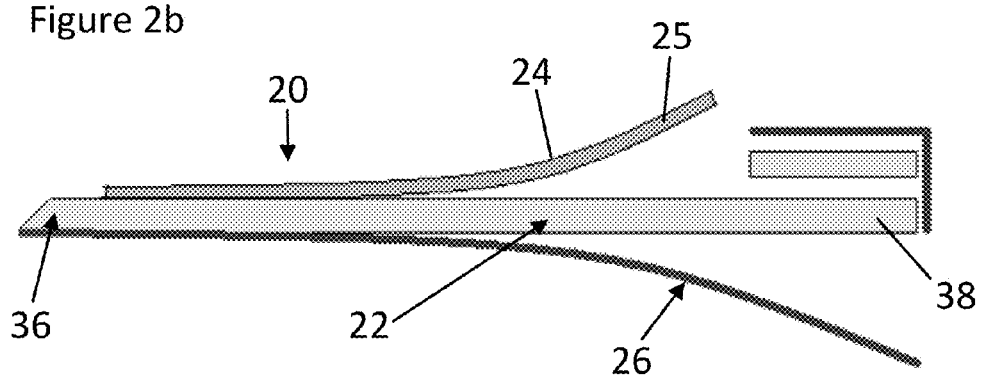
Figure 3A:
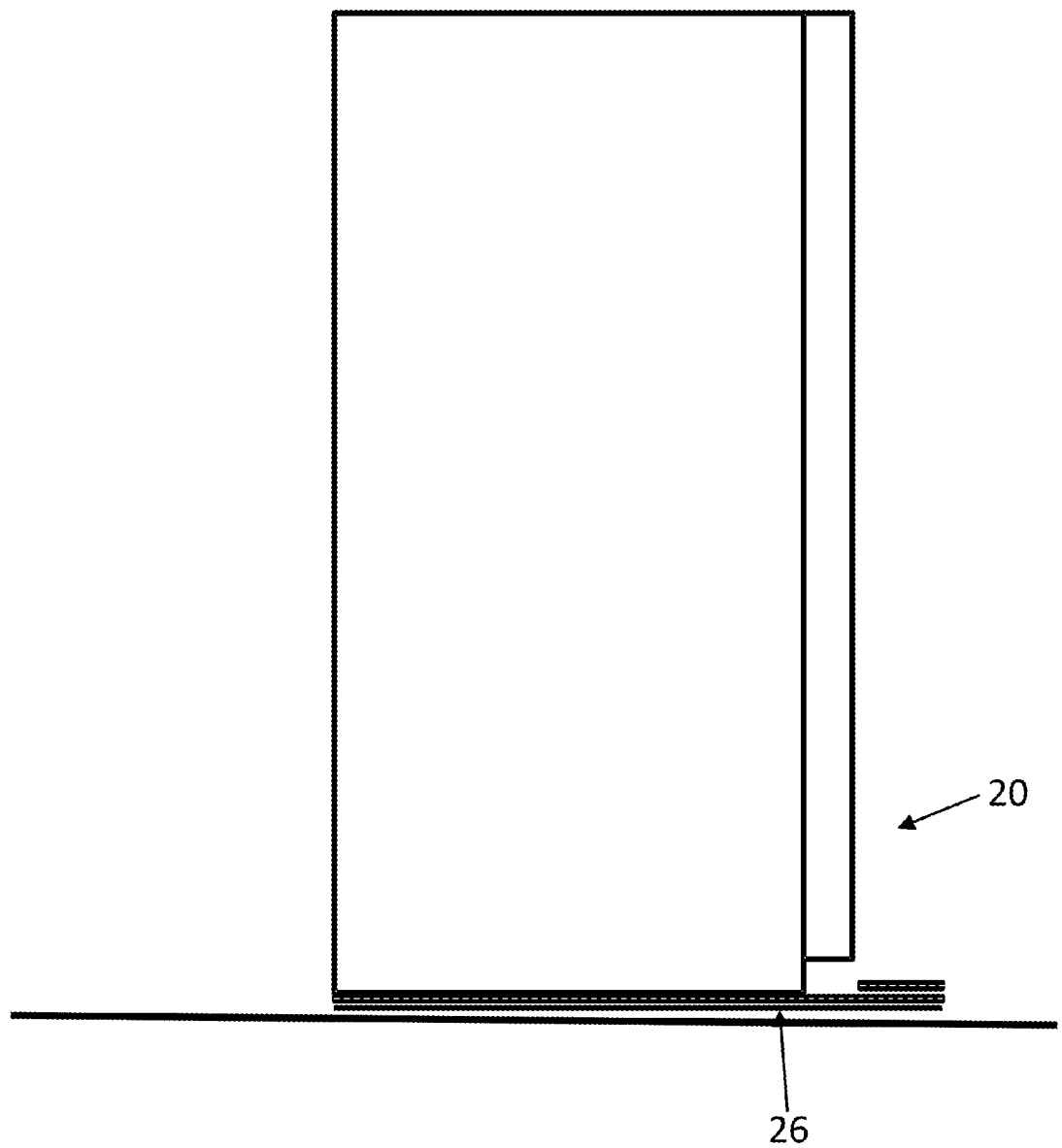
FIGS. 3a and 3b represent side and front views of a pair of appliance movers positioned between an appliance and a floor surface.
Figure 3B:
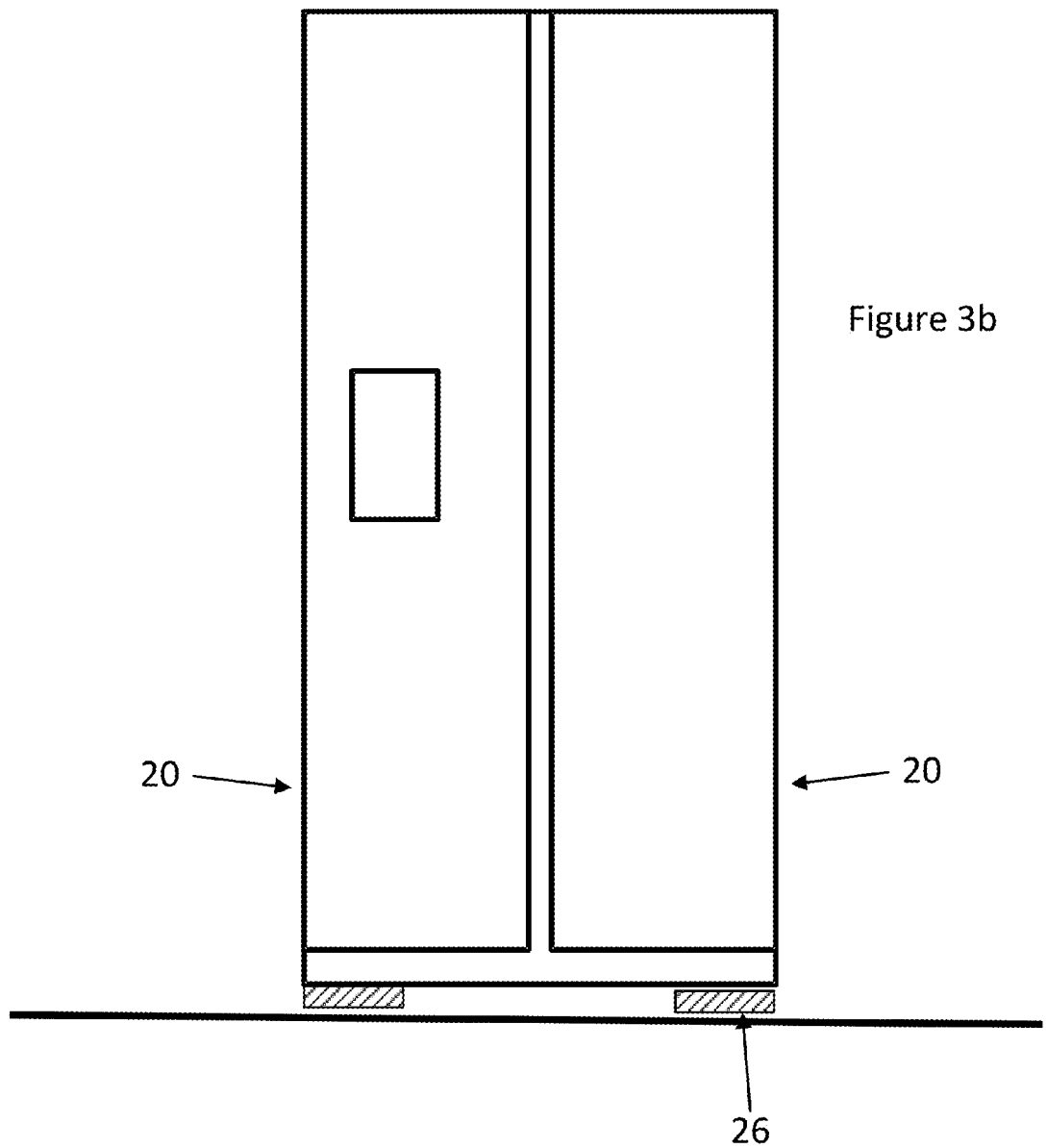

With reference to FIGS. 1a-c and 2a-b, shown is an appliance mover 20 according to the present teachings. The mover 20 is formed of a laminate material that has a thin semi-ridged and flexible core 22, a top surface layer 24, and a lower layer 26. The core 22 can be formed of a flexible sheet of material that will resist fracturing when bent while absorbing and distributing the weight of the appliance being moved, such that the class-A surface below the appliance mover 20 is unaffected. The mover 20 is generally elongated in shape having a central axis. The core 22 can be formed of a fiber-reinforced material having a matrix and a reinforcement phase. The reinforcement phase can be chopped or long fibers aligned generally parallel to the longitudinal axis of the mover 20.

In one embodiment, the core 22 can be a natural composite. In this regard, the composite material can be a plywood sheet that is flexible in-plane, or a natural composite such as bamboo. When the core is bamboo, the natural grain can be aligned with the longitudinal axis. However, the core can assist of any other material that can resist fracturing while absorbing and distributing weight of the appliance such as polyethylene, polypropylene, various impregnated or laminated fibrous materials, etc.

The top surface layer 24 of the mover 20 may consist of a friction layer or coating 25 which would aid in the appliance staying in place on mover 20 when being slid across hard surfaces of a finished nature. In one embodiment, friction layer 25 is a layer of open or closed cell foam in which the weight of the appliance would compress into the layer 24 to help settle it upon mover 20. However, the friction layer can consist of other coatings or materials such as rubber, neoprene, foam, plastics or other impregnated materials that would create a friction surface that is preferably elastically deformable so as to engage with the bottom of the appliance.

The bottom layer 26 of the mover 20 may be formed of an anti-friction layer that would aid in allowing the user to horizontally slide the appliance across a hard surface such as hardwood, tile, and linoleum without causing scratches, punctures or tears of the flooring.

In one embodiment, the bottom layer 26 or underside of the mover would have a layer non-woven or woven fabric. The non-woven fabric can be a layer of felt covering its surface. However, the bottom can consist of any other anti-friction agent or application such as fabrics, silicones, plastics or other materials that would aid in a sliding action such as a layer of Teflon.

The mover 20 can define an oval hole that can function as a handle 28. The handle 28 of the mover may consist of an additional layer to reinforce the mover structurally for providing a place to pull (handle cutout 30) the appliance or object being moved.

In one embodiment, the core 22 can be multi-layered material tied together with adhesive material that can also be used to adhere the top and bottom layer to the core. However, structural reinforcement could consist of any material layering, webbing or addition giving increased strength and structural integrity. The handle cutout 30 of the mover provides a means of gripping the mover when an appliance is in place and to pull the appliance up onto the finished surface during installation.

The mover 20 can have a beveled edge 36 or ramp. The beveled edge 36 of the mover aids in rolling appliances on to the mover when rollers or casters are present. The beveled edge 36 can have a defined curved edge 40. The curved edge 40 of the mover aids in guiding appliance back into place when coming into contact with surfaces such as cabinets, walls or trim.

Each of the layers of the mover or the core 22 can be held together by a layer of flexible adhesive layer 38. The adhesive layer 38 of the mover bonds all components of mover and can optionally allow a slight amount of movement between the laminate layers, thus increasing flexibility.

According to the present teachings, a method of moving an appliance over a flooring surface is disclosed. A pair of movers 10 is laid onto the flood surface with the felt surface located onto the floor surface and the friction surface up. The appliance is the rocked backward to allow the insertion of the mover under the appliance. The appliance is then fully seated onto the friction surface of the pair of movers. The movers are then slid across the floor to place the appliance in the needed location. The appliance is then rocked back to remove the movers from beneath the appliance.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

What is claimed is:

1. A system for moving an appliance over a floor surface comprising:
    longitudinal laminate body defining a longitudinal axis including top friction engagement surface configured to engage a bottom surface of the appliance;
    the longitudinal laminate body comprising a bamboo core layer coupled to the top friction layer, the bamboo core layer comprising a reinforcement phase and matrix phase, the reinforcement phase of the bamboo being aligned with the longitudinal axis; and
    non-woven fabric layer coupled to the longitudinal laminate body.

2. The system according to claim 1, wherein the core layer defines an oval handle.

3. The system according to claim 1, wherein the longitudinal laminate body defines a ramped surface.

4. The system according to claim 1, wherein the non-woven fabric is felt.

5. The system according to claim 1, wherein the core has a thickness of less than ½ inch.

6. The system according to claim 1, wherein the longitudinal laminate body defines an oval handle.

7. The system according to claim 1, wherein the longitudinal laminate body defines a ramped surface.

8. The system according to claim 1, wherein the non-woven fabric is ⅛ inch thick.

9. The system according to claim 1, wherein the core has a thickness less than ¼ inch.

10. The system according to claim 1, wherein the core has a thickness of less than ½ inch.

11. A system for moving an appliance over a floor surface comprising:
    longitudinal laminate body defining a longitudinal axis, the longitudinal laminate body including top friction engagement surface configured to engage a bottom surface of the appliance; formed of elastically deformable foam;
    the longitudinal laminate body comprising a core layer coupled to the top friction layer, the core layer comprising a bamboo layer having a reinforcement phase aligned with the longitudinal axis and a matrix phase; and
    felt fabric layer coupled to the core layer.

* * * * *